US005464292A

United States Patent [19]
Grant

[11] Patent Number: 5,464,292
[45] Date of Patent: Nov. 7, 1995

[54] KEYBOARD ALIGNMENT DEVICE

[76] Inventor: Alan H. Grant, 3208 Woodhollow Dr., Chevy Chase, Md. 20815

[21] Appl. No.: 42,017

[22] Filed: Apr. 2, 1993

[51] Int. Cl.⁶ .................................................. B43L 15/00
[52] U.S. Cl. ..................... 400/715; 248/118.1; D14/114; D18/12
[58] Field of Search ........................... 400/715; 248/118, 248/118.1, 118.3, 118.5, 918; D14/114, 115, 100; D18/1, 7, 12

[56] References Cited

U.S. PATENT DOCUMENTS

| D. 346,816 | 5/1994 | Kline et al. | D16/131 |
| D. 347,216 | 5/1994 | Ciccone | D14/114 |
| 4,545,554 | 10/1985 | Latino et al. | 248/118.1 |
| 4,635,893 | 1/1987 | Nelson | 400/718 |
| 5,163,646 | 11/1992 | Engelhardt | 248/118 |
| 5,183,230 | 2/1993 | Walker et al. | 248/118 |
| 5,244,296 | 9/1993 | Jensen | 400/715 |
| 5,326,056 | 7/1994 | Smith | 248/118 |

OTHER PUBLICATIONS

Barbara Stack, "Keyboard RSI: The Practical Solution", 1987, pp. 21–41.

*Primary Examiner*—David A. Wiecking
*Attorney, Agent, or Firm*—Jacobson, Price, Holman & Stern

[57] ABSTRACT

An adjustable one-piece platform is constructed or molded with a plastic living hinge at a front edge to which is integrally attached an elevating projection. The front edge elevating projection can be rotated about the living hinge into one of several positions. This permits the bottom surface of the keyboard alignment device of the present invention to remain in a horizontal plane on a desktop or a computer work surface platform. Further, the keyboard alignment device is able to have the angle of inclination of the bottom surface changed with respect to a horizontal work surface. A traditional flat/rectangular keyboard is placed on an upper rear surface of the keyboard alignment device. The traditional keyboard maintains its front to rear taper when an elevating projection of the keyboard alignment device is at right angles to the desktop or work surface. When the elevating projection is folded underneath the bottom surface of the keyboard alignment device, then the front to rear taper of the keyboard is negated.

13 Claims, 3 Drawing Sheets

KEYBOARD ALIGNMENT DEVICE

FIELD OF THE INVENTION

This invention relates to a keyboard alignment device for a flat/rectangular keyboard so as to align an operator's hands in a prehensile position and to maintain the operator's hand/wrist junction in a vertically neutral posture, regardless of the height of the user, the chair height and the desk height.

BACKGROUND OF THE INVENTION

Office equipment utilizing a video display and keyboard input is known. The widespread use of these devices has proven that, in many cases, severe physical strain results from their daily use. Many attempts have been made to reduce the strain caused by these devices by positioning the keyboard, display screen, and other associated components appropriately. None of these solutions have been completely successful.

One company, PROFORMIX, offers a negative-slope keyboard support that is positioned below a desk top by an angled bracket. The keyboard support is part of an integrated workstation system including a copyholder, a mouse and a writing platform as part of an effort to improve overall body posture.

Traditional flat/rectangular keyboards typically taper from a low front elevation to a slightly higher rear elevation. In addition, these keyboards usually have an adjustable support which can further elevate the rear surface.

Depending upon the height of the desk that supports the keyboard, the hand-wrist junction of the user will either be in (a) a neutral position, or undesirably postured into either (b) a flexion position, or (c) an extension position.

The effect of the configuration of present-day keyboards is to force the hand-wrist junction into an undesirable extension posture to access the keyboard. A neutral hand-wrist posture is only possible if the keyboard platform is set at a much higher plane, i.e. at approximately thirty-six inches, as opposed to an average desk height of approximately twenty-five to twenty-seven inches. This extension posture of the hand-wrist junction is evident when the user chooses to access the keyboard with the wrist higher than the elbow.

In using a computer, the relation of vision to hand/finger actuated keyboard usage in performing fine motor-coordinated functions is influenced by the physical location, size, and collective placement of the keys. Traditional nonprehensile flat/rectangular keyboard applications usually require a high and nearly constant level of visual attention.

Workpace and related physiological changes, aging, onset of monocularization (intermittent lapsing of binocularity for near vision) that accompanies presbyopia, tool colors, and background contrast are factors affecting constancy of visual attention to task performance. Capitas extension, excessive excyclotorsion, and repetitive strain injuries (such as carpal tunnel syndrome) are common and debilitating concomitants to computer usage. These problems can be remedied by improved keyboard design or altering the placement of standard keyboards.

SUMMARY OF THE INVENTION

Tool acquisition (wherein the tool is to be securely controlled within the structure of the hand) preparatory to tool usage requires that this appendage be adapted for seizing and grasping. The essential characteristics of prehensility is that we do have an anatomically opposable thumb and, with some variations, it functions with a ventral-to-ventral surface apposition of the thumb to the finger(s).

Nonprehensile tool usage involves pushing or in some other manner moving a tool without the tool being held in control within the hand, and does not possess the same level of precision, sensitivity, and gentle control that is attributable to prehensile activity. The usage of traditional flat/rectangular computer keyboards mandates that the hands be fully pronated into the horizontal plane and ulnar-deviated outward at the hand-wrist junction, and therein lies a major cause of repetitive strain injuries.

Tool usage within this environment would have to be considered nonprehensile, because the percussion of each key is executed in a direction which is essentially away from the action and the range-of-motion of the opposable thumb. It has been beneficially recognized that if the keyboard is reshaped into a biometric form incorporating a moderate V-shape and moderate center-peaking, these attributes permit a relatively straight hand-wrist junction and allow for less pronation of the hands into the horizontal plane.

By placing a standard keyboard on the keyboard alignment device of the present invention, the keyboard operation by the user begins to simulate prehensile tool usage and facilitates the action of the opposable thumb in moving toward the fingers (and, to a lesser extent, the fingers moving toward the opposable thumb). Prehensile activity affords multiple choices of power gripping or precision gripping in holding tools, and thereby provides much finer tool usage control.

Working with traditional flat/rectangular keyboards classifies as nonprehensile activity and therefore requires greater visual dependency and quicker onset of asthenopia, stress and fatigue. Creation of a platform for receipt of a standard keyboard facilitates prehensile hand(s) posture in which the ventral surface of the thumb(s) essentially oppose the ventral surface(s) of the finger(s).

By the present invention, an adjustable one-piece platform is constructed or molded, with a plastic living hinge at a front edge to which is integrally attached an elevating projection. The front edge elevating projection can be rotated about the living hinge into one of several positions. This permits the bottom surface of the keyboard alignment device of the present invention to remain in a horizontal plane on a desktop or a computer work surface platform. Further, the keyboard alignment device is able to have the angle of inclination of the bottom surface changed with respect to a horizontal work surface.

A traditional flat/rectangular keyboard is placed on an upper rear surface of the keyboard alignment device. The traditional keyboard maintains its front to rear taper when an elevating projection of the keyboard alignment device is at right angles to the desktop or work surface. When the elevating projection is folded underneath the bottom surface of the keyboard alignment device, then the front to rear taper of the keyboard is negated.

In addition, on the upper front surface of the base of the keyboard alignment device are two lateral ramps which are angled upwardly and inwardly. These ramps serve to guide the hand-wrist junction into a semi-pronated posture in accessing the keyboard. A central recess located between the two lateral ramps ensures clear access of the thumbs to the space bar and also ensures that only the outer area of the heel of each palm is in physical contact with the ramps. This minimizes the restriction of hand-wrist motility in performing keyboard keystroking, and therefore minimizes errors.

The keyboard alignment device of the present invention can accommodate any traditional flat/rectangular keyboard. Since almost all keyboards have their space bar somewhat offset to the left side, the keyboard is placed on the base of the keyboard alignment device, slightly displaced to the right. This permits the alignment of the midpoint of the central recess with the midpoint of the space bar.

To minimize the space requirements of the keyboard alignment device of the present invention, a typical keyboard measuring eight inches wide by eighteen plus inches long is placed on the keyboard alignment device to match the midpoint of the space bar to the midpoint of the center recess. The keyboard may extend beyond the upper rear surface of the base of the keyboard alignment device by approximately one inch and beyond the right side of the base by approximately 1.5 to 2 inches. This overhang is insignificant in balancing the keyboard on the keyboard alignment device when any right side keys or any upper row rear keys are actuated. Alternatively, the keyboard alignment device may be manufactured to occupy the same space as would a traditional keyboard, thereby eliminating any overhang or have increased surface area so as to accommodate most all keyboards regardless of the positioning of the keyboard on the keyboard alignment device.

In accessing a computer keyboard, there are four desirable hand/wrist/finger/thumb working postures. First, there is a relatively straight hand/wrist position. Second, there is a less than 90° hand rotation (pronation) into a horizontal plane. Third, there is a vertical, neutral hand/wrist position where the hand is either extended upwardly above the axis of the forearm, or flexed below the axis of the forearm. Fourth, the keys such as the space bar, which are designed to be actuated by the thumb(s), are so actuated by the thumb(s) moving towards the finger(s) in a natural grasping (prehensile) movement.

By the present invention, a traditional flat/rectangular keyboard is altered in its position so as to satisfy at least three of the above-listed working postures, and preferably, the second and third working posture.

Vertical hand/wrist positioning is a product of combined influences of the computer user's height, chair height and keyboard platform height. If these combined influences are such that:

1. The hand/wrist junction is above the bottom of the elbow, by approximately 7°–10°, then accessing the flat/rectangular keyboard, which usually has a slight back-to-front downward taper of approximately 7°–10°, will produce a vertical, neutral hand/wrist posture;
2. If the hand/wrist junction is above the elbow by a greater amount, then the rear of the keyboard needs to be further elevated so that the operational surface of the keyboard remains parallel to the vertical, neutral hand/wrist posture;
3. If the hand/wrist junction is at the same level as the elbow, then the front of the keyboard needs to be elevated so that its operational surface remains parallel to a vertical, neutral hand/wrist posture; and
4. If the hand/wrist junction is below the level of the elbow, then the front of the keyboard has to be further elevated to remain parallel to the operational surface of the keyboard and the vertical, neutral hand/wrist posture. If the user chooses to access the keyboard with the wrist lower than the elbow, then in order to approximate a neutral hand-wrist junction, the keyboard platform has to be angled downward from front to back, effectively negating the front to rear taper of the keyboard.

To achieve these goals, a living hinge at a rear edge of the keyboard alignment device is used to elevate the base of the keyboard alignment device to provide a back-to-front slant. This will satisfy the condition set forth in numbered paragraph 2 above.

Further, a double living hinge at a front edge of the base of the keyboard alignment device can be folded underneath the bottom surface of the base to provide two elevations at the front edge of the base. This will vary the front elevation of the base to satisfy the condition described in numbered paragraphs 3 and 4 listed above.

Due to the versatility of the keyboard alignment device to create three separate angled positions to support a flat/rectangular keyboard, a vertical, neutral hand/wrist posture is achievable, regardless of the height of the user, chair height and keyboard platform height.

Accordingly, it is an object of the present invention to alter a traditional flat/rectangular keyboard so as to place the hands of an operator in a prehensile position with respect to the keyboard.

It is another object of the present invention to change the taper of a traditional flat/rectangular keyboard so as to maintain an operator's hand/wrist positioning in a vertical, neutral hand/wrist posture.

It is still another object of the present invention to change the taper of a traditional flat/rectangular keyboard so as to maintain an operator's hand/wrist positioning in a vertical, neutral hand/wrist posture by elevating the front edge or the rear edge of a base of a keyboard alignment device.

It is still yet another object of the present invention to change the taper of a traditional flat/rectangular keyboard so as to maintain an operator's hand/wrist positioning in a vertical, neutral hand/wrist posture by elevating the front edge or the rear edge of a base of a keyboard alignment device by folding an elevating projection under a bottom surface of the base of the keyboard alignment device.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
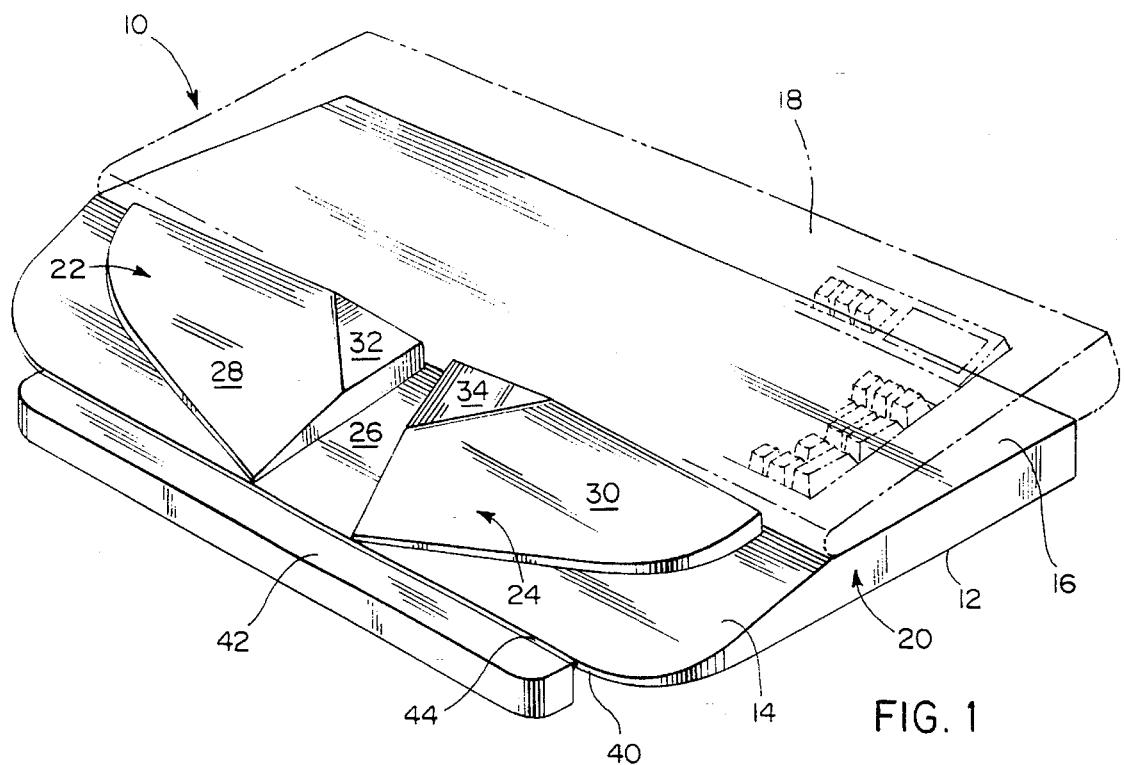
FIG. 1 is a front perspective view of the keyboard alignment device illustrating a traditional flat/rectangular keyboard mounted on an upper rear surface of a base of the device.
Figure 2:
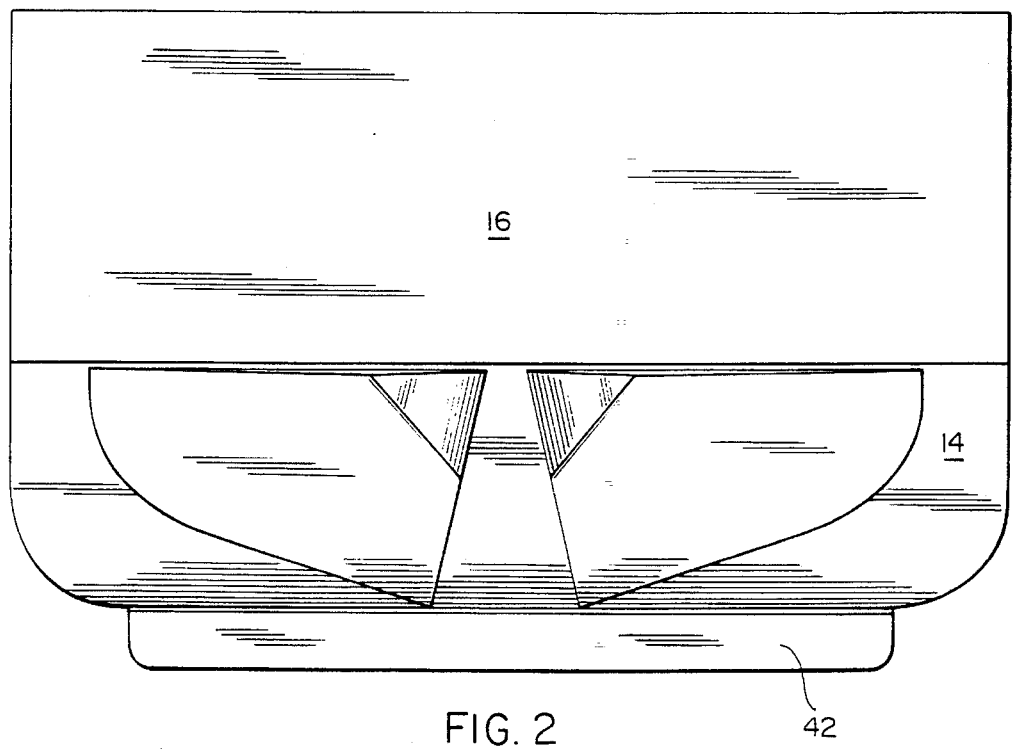
FIG. 2 is a plan view of the keyboard alignment device.
Figure 3:
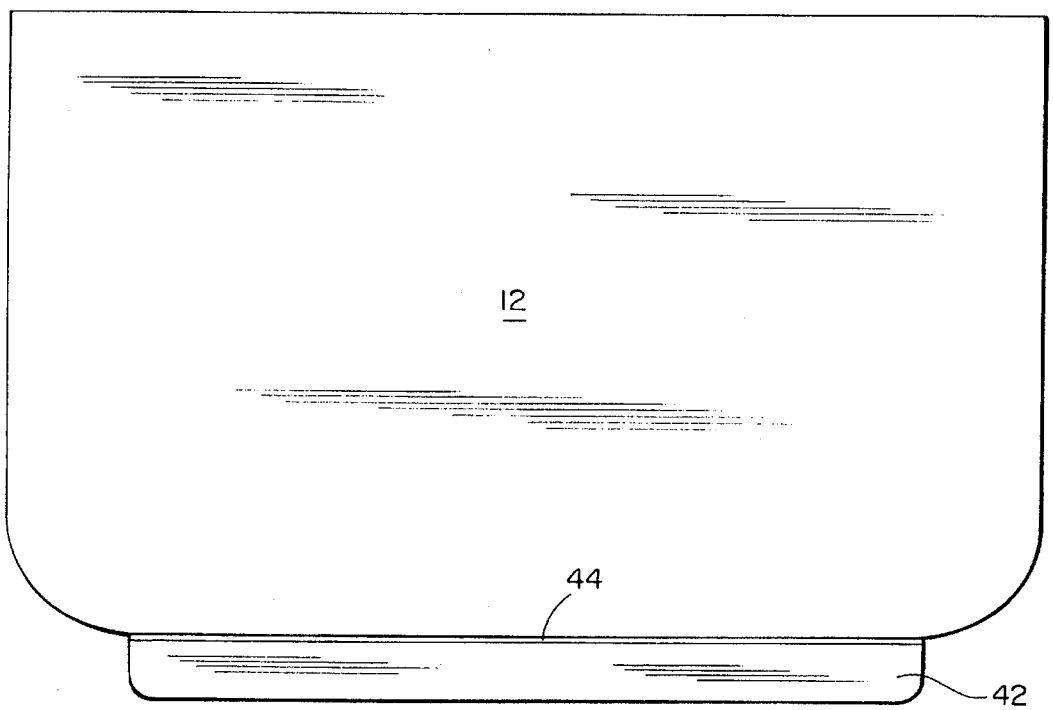
FIG. 3 is a bottom plan view of the keyboard alignment device.
Figure 4:
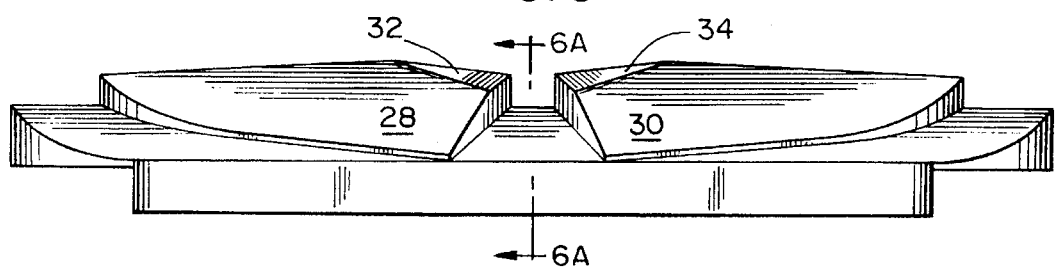
FIG. 4 is a front elevational view of the keyboard alignment device.
Figure 5:
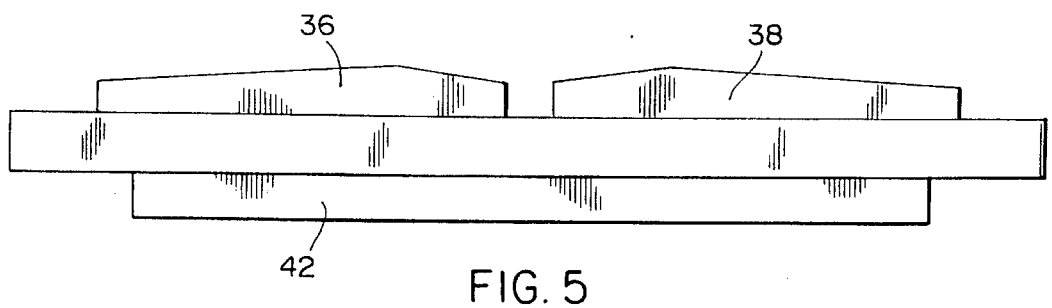
FIG. 5 is a rear elevational view of the keyboard alignment device.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 6B, in particular, a keyboard alignment device embodying a preferred embodiment of the subject invention is generally designated as 10. With reference to its orientation in FIG. 1, the keyboard alignment device includes a base 20 having a bottom surface 12, a front upper surface 14 and a rear upper surface 16. For purposes of illustration, a traditional flat/rectangular keyboard 18 is shown in dotted lines, positioned on the rear upper surface 16 of the base 20 of the keyboard alignment device 10.

Front upper surface 14 tapers downwardly from rear upper surface 16 at an angle of approximately 10°. Rear upper surface 16 is substantially parallel to bottom surface 12.

Positioned symmetrically on front upper surface 14 are two lateral ramps 22 and 24. A central dividing recess 26 is V-shaped and is located between the two lateral ramps 22, 24. A first surface 28, 30 of lateral ramps 22, 24 slopes upwardly from front upper surface 14 at an angle of approximately 10° towards triangular portions 32, 34 of lateral ramps 22, 24, respectively. The triangular portions 32, 34 slope downwardly from the inclined portions 28, 30 towards central recess 26 at an angle of approximately 10°.

Upper rear surface 16 is shaped to support keyboard 18. Upper rear surface 16 may be slightly less than to at least equal to the dimensions of the keyboard 18.

A substantially vertically extending surface 36, 38 of the lateral ramps 22, 24 forms an abutment for a leading edge of the keyboard 18. The keyboard is positioned with respect to the lateral ramps 22, 24 so that the central recess 26 is located approximately at the midpoint of the space bar of the keyboard 18.

Located at a front edge 40 of the base 20 is an elevating projection 42 of approximately square shape. The elevating projection 42 is connected to the front edge 40 of the base 20 by a plastic living hinge 44 or alternate pivoting connection which permits the movement of the projection 42 from a position shown in FIG. 6A, in a first position, where the projection 42 hangs over a forward edge 46 of a desktop or workstation table 48. Alternately, in a second position, the elevating projection 42 is folded about hinge 44 to a position shown in FIG. 6B to elevate the bottom surface 12 by approximately 4° to 6°.

Figure 6A:
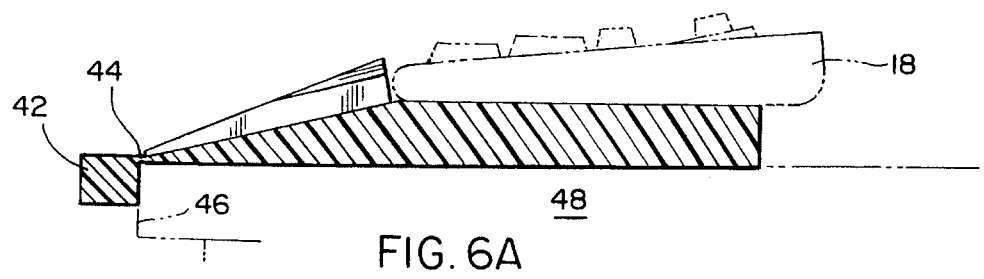
FIG. 6A is a sectional view taken along lines 6A—6A of FIG. 4.
Figure 6B:
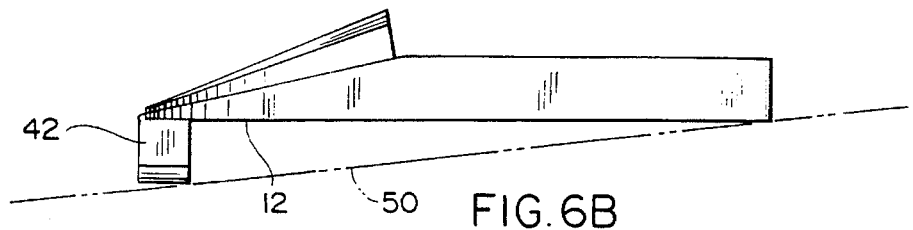
FIG. 6B is a side elevational view of the keyboard alignment device.

In FIG. 6B, a desktop or workstation top 50 is inclined downwardly. The elevating projection 42 is folded underneath the bottom surface 12 of the base 20 so as to elevate the bottom surface 12 into a substantially horizontal position similar to the position of the bottom surface 12 in FIG. 6A.

In the preferred embodiment of FIGS. 1 through 6B, the lateral ramps are positioned so that the rear portion of the palm of the typist is positioned towards a leading edge of the lateral ramps, positioned closest to the front edge 40 of the base 20. In this position, the thumbs of the operator rest on triangular surfaces 32, 34 so as to be positioned adjacent to the keys normally operated by the thumbs, including the space bar. By the inclination of the lateral ramps, the hands of the typist are moved into a prehensile orientation with respect to the keys of the keyboard. As discussed above, the benefits obtained by orienting the hands of the typist in a prehensile position are achieved.

Depending upon the position of the typist, whether sitting or standing, with a keyboard located at a height offsetting the position of the hand/wrist junction with respect to the elbow of the operator, the position of the keyboard is varied by the keyboard alignment device so that the hand/wrist junction position is altered to produce a vertical, neutral hand/wrist posture. This is shown in the various positions of the keyboard alignment device in FIGS. 6A through 8D.

Figure 7A:
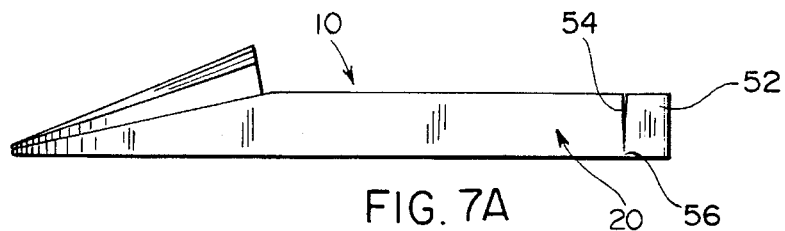
FIGS. 7A and 7B are side elevational views of an alternate embodiment of the keyboard alignment device.
Figure 7B:
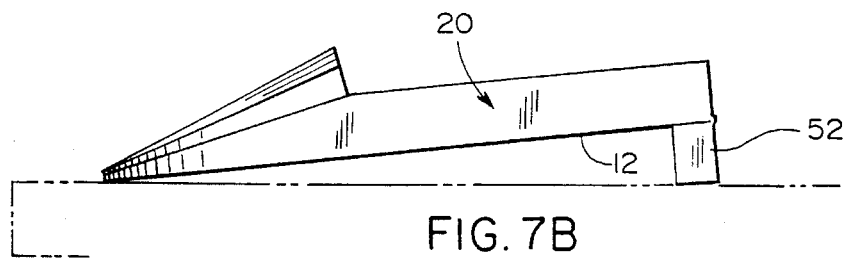

In FIGS. 7A and 7B, an elevating projection 52 is connected to a rear edge 54 of a base 20 by a living hinge portion 56. In FIG. 7A, the keyboard alignment device 10 is used with a flat desktop or workstation. However, as illustrated in FIG. 7B, the elevating projection 52 is folded under the bottom surface 12 of the base 20 to elevate the rear of the keyboard alignment device by approximately 4° to 6° when the hand/wrist junction is above the elbow so as to position the operational surface of the keyboard so as to remain parallel to a vertical, neutral hand/wrist posture.

In the embodiment of FIGS. 8A through 8D, a front edge elevating projection 58 is shown connected to a front edge 40 of a base 20 by a living hinge 60. The elevating projection 58 is formed of two approximately square-shaped portions 62, 64. Portion 62 is connected by living hinge 60 to front edge 40 whereas portion 64 is connected to portion 62 by another living hinge 66.

Similar to FIG. 6A, in the instance where the bottom surface 12 of base 20 is to lie flat on top of a desk or workstation 68, the elevating projection 58 hangs over a forward edge 70 of the desk or workstation. However, in the situation as in FIG. 6B, or where necessary with a flat desktop or workstation as in FIG. 8C, and an elevation of the keyboard alignment device is necessary, the elevating portion 58 is folded under the bottom surface 12 of the base 20. The front edge 40 of the base is raised by 4° to 6° with respect to the desktop or workstation.

Figure 8A:
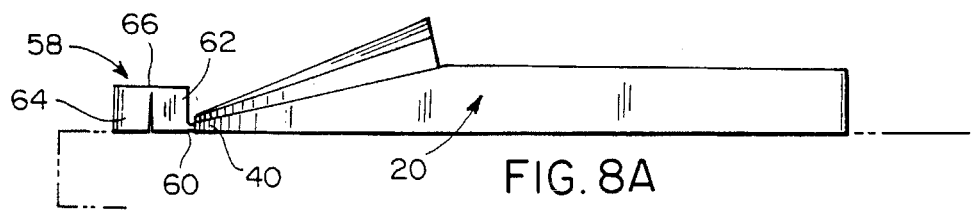
FIGS. 8A through 8D are side elevational views of another embodiment of the keyboard alignment device.
Figure 8B:
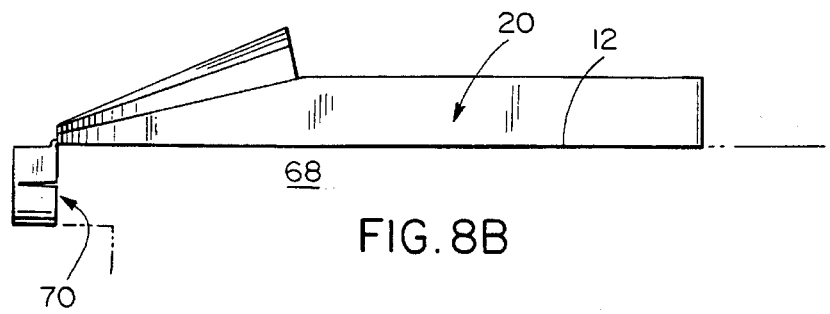
Figure 8C:
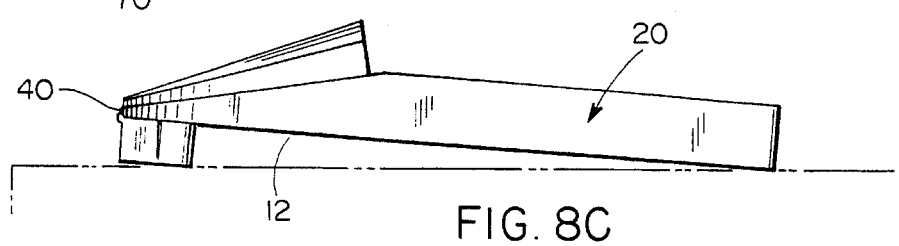
Figure 8D:
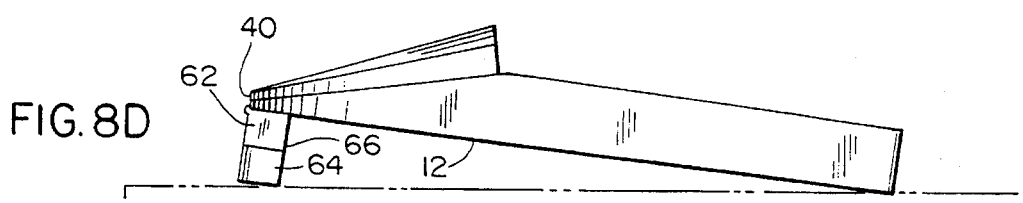

In the instance where the hand/wrist junction is below the level of the elbow, then the front edge 40 of the base 20 is further elevated by both portions 62 and 64 of the elevating projection being positioned below the bottom surface 12 so as to further elevate the bottom surface 12 by approximately 7° to 11° and move the keyboard alignment device into the position shown in FIG. 8D.

Having described the invention, many modifications thereto will become apparent to those skilled in the art to which it pertains without deviation from the spirit of the invention as defined by the scope of the appended claims.

I claim:

1. A keyboard alignment device comprising:
   a base having a bottom surface, an upper front surface and an upper rear surface for supporting a keyboard on said upper rear surface,
   two spaced ramps located on said upper front surface,
   a central recess formed between said two spaced ramps,
   an elevating projection pivotally mounted on said base, said elevating projection including two portions pivotally mounted to each other, and
   a hinge for pivotally mounting said elevating projection on said base.

2. A keyboard alignment device as claimed in claim 1, wherein said elevating projection is pivotally mounted on a front edge of said base.

3. A keyboard alignment device as claimed in claim 1, wherein said elevating projection is pivotally mounted on a rear edge of said base.

4. A keyboard alignment device as claimed in claim 1, wherein said upper rear surface and said bottom surface are substantially parallel.

5. A keyboard alignment device comprising:

a base having a bottom surface, an upper front surface and an upper rear surface for supporting a keyboard on said upper rear surface, two spaced lateral ramps located on said upper front surface forming a central recess therebetween for positioning of a space bar of the keyboard adjacent to said central recess and for positioning the hands of an operator on said two spaced lateral ramps so as to orient the hands of the operator in a prehensile position, and an elevating projection pivotally mounted on said base, said elevating projection including two portions pivotally mounted to each other.

6. A keyboard alignment device as claimed in claim 5, wherein said elevating projection is pivotally mounted on a front edge of said base.

7. A keyboard alignment device as claimed in claim 5, wherein said elevating projection is pivotally mounted on a rear edge of said base.

8. A keyboard alignment device as claimed in claim 5, wherein said upper front surface tapers upwardly to said upper rear surface.

9. A keyboard alignment device as claimed in claim 8, wherein said upper rear surface and said bottom surface are substantially parallel.

10. A keyboard alignment device as claimed in claim 5, wherein each of said two lateral ramps includes an upwardly tapering surface portion and a downwardly tapering surface portion.

11. A keyboard alignment device as claimed in claim 10, wherein said downwardly tapering surface extends towards said central recess.

12. A keyboard alignment device as claimed in claim 5, wherein a substantially vertical surface of said two lateral ramps abuts a leading edge of the keyboard.

13. A keyboard alignment device as claimed in claim 5, wherein said elevating projection is foldable under said bottom surface.

* * * * *